United States Patent
Ennis et al.

(10) Patent No.: US 8,882,938 B2
(45) Date of Patent: Nov. 11, 2014

(54) HIGH STRENGTH HOT DIP GALVANISED STEEL STRIP

(75) Inventors: Bernard Leo Ennis, Haarlem (NL); David Neal Hanlon, Hillegom (NL)

(73) Assignee: Tata Steel Ijmuiden B.V., Ijmuiden (NL)

( * ) Notice: Subject to any disclaimer, the term of this patent is extended or adjusted under 35 U.S.C. 154(b) by 163 days.

(21) Appl. No.: 13/516,221

(22) PCT Filed: Dec. 21, 2010

(86) PCT No.: PCT/EP2010/007819
§ 371 (c)(1), (2), (4) Date: Jul. 30, 2012

(87) PCT Pub. No.: WO2011/076383
PCT Pub. Date: Jun. 30, 2011

(65) Prior Publication Data
US 2012/0288733 A1    Nov. 15, 2012

(30) Foreign Application Priority Data

Dec. 21, 2009 (EP) .................. 09015781

(51) Int. Cl.
| | |
|---|---|
| C21D 8/02 | (2006.01) |
| B32B 15/01 | (2006.01) |
| C22C 38/38 | (2006.01) |
| C22C 38/26 | (2006.01) |
| C22C 38/06 | (2006.01) |
| C21D 6/00 | (2006.01) |
| C22C 38/00 | (2006.01) |
| C22C 38/02 | (2006.01) |
| C23C 2/40 | (2006.01) |

(52) U.S. Cl.
CPC .............. *C22C 38/38* (2013.01); *B32B 15/013* (2013.01); *C21D 6/005* (2013.01); *C21D 8/0226* (2013.01); *C21D 8/0236* (2013.01); *C21D 8/0273* (2013.01); *C22C 38/002* (2013.01); *C22C 38/02* (2013.01); *C22C 38/06* (2013.01); *C22C 38/26* (2013.01); *C23C 2/40* (2013.01); *C21D 2211/002* (2013.01); *C21D 2211/005* (2013.01); *C21D 2211/008* (2013.01)
USPC ........... 148/333; 148/334; 148/335; 148/533; 148/652; 428/659

(58) Field of Classification Search
None
See application file for complete search history.

(56) References Cited

U.S. PATENT DOCUMENTS

| | | | |
|---|---|---|---|
| 2007/0110914 | A1 | 5/2007 | Masukawa et al. |
| 2007/0122554 | A1 | 5/2007 | Matsuda et al. |
| 2007/0190353 | A1 | 8/2007 | Taniguchi et al. |
| 2008/0163961 | A1 | 7/2008 | Nakagaito et al. |
| 2008/0283154 | A1 | 11/2008 | Taniguchi et al. |
| 2009/0014098 | A1 | 1/2009 | Matsuda et al. |
| 2010/0139816 | A1* | 6/2010 | Hanlon et al. ............... 148/526 |

FOREIGN PATENT DOCUMENTS

| | | |
|---|---|---|
| EP | 0969112 A1 | 1/2000 |
| EP | 1696048 A1 | 8/2006 |
| EP | 1707645 A1 | 10/2006 |
| EP | 1724371 A1 | 11/2006 |
| EP | 1867746 A1 | 12/2007 |
| EP | 1867747 A1 | 12/2007 |
| EP | 1889935 A1 | 2/2008 |
| JP | 2004256836 A | 9/2004 |
| JP | 2007262553 A | 10/2007 |
| JP | 2008280577 A | 11/2008 |
| WO | 2008/102009 A1 | 8/2008 |

OTHER PUBLICATIONS

Machine-English translation of Japanese patent No. 2007-262553, Takagi Shusaku et al., Oct. 11, 2007.*
Machine-English translation of Japanese patent No. 2004-292891, Nakagaito Tatsuya et al., Oct. 21, 2004.*
International Search Report dated Mar. 4, 2011 from International Application PCT/EP2010/007819 (WO2011/076383 A1).
BS1140: 1993, Specification for Resistance spot welding of uncoated and coated low carbon steel, BSI, 5th ed. (1993).

* cited by examiner

*Primary Examiner* — Deborah Yee
(74) *Attorney, Agent, or Firm* — Novak Druce Connolly Bove + Quigg LLP

(57) ABSTRACT

A high strength hot dip galvanized steel strip including, in mass percent, of the following elements: 0.10-0.18% C, 1.90-2.50% Mn, 0.30-0.50% Si, 0.50-0.70% Al, 0.10-0.50% Cr, 0.001-0.10% P, 0.01-0.05% Nb, max 0.004% Ca, max 0.05% S, max 0.007% N, and optionally at least one of the following elements: 0.005-0.50% Ti, 0.005-0.50% V, 0.005-0.50% Mo, 0.005-0.50% Ni, 0.005-0.50% Cu, max 0.005% B, the balance Fe and inevitable impurities, wherein 0.80%<Al+Si<1.05% and Mn+Cr>2.10%. This steel offers improved formability at a high strength, has a good weldability and surface quality together with a good produce-ability and coat-ability.

17 Claims, No Drawings

HIGH STRENGTH HOT DIP GALVANISED STEEL STRIP

CROSS-REFERENCE TO RELATED APPLICATIONS

This application is a §371 National Stage Application of International Application No. PCT/EP2010/007819, filed on 21 Dec. 2010, claiming the priority of European Patent Application No. 09015781.9 filed on 21 Dec. 2009.

The invention relates to a high strength hot dip galvanised steel strip having improved formability, such as used in the automotive industry.

Such steel types are known and have been developed under the name of dual phase steel types. Such steel types do not provide the required formability as required in many applications for the automotive industry. For this reason, TRIP assisted dual phase steel types have been developed.

A document describing such steel types is EP 1 889 935 A1. This document describes a high strength hot dip galvanised steel sheet containing (in mass percent)
0.05-0.3% C
0.08-3% Mn
max 1.4% Si
0.1-2.5% Al
0.1-0.5% Cr
0.003-0.1% P
max 0.07% S
max 0.007% N
the balance being Fe and incidental impurities, and wherein Si+Al≥0.5%. Optionally a number of other elements can be present. Thirty-one steel types have been tested at laboratory scale, of which nineteen are deemed inventive compositions. These examples show that a wide range of the amounts of especially Si and Al are fulfilling the inventiveness requirements according to EP 1 889 935 A1.

Formability, however, is not the only requirement for a TRIP assisted dual phase steel strip. The alloying elements should be low in amount to make the cost of the steel as low as possible, it should be as easy as possible to produce the steel strip and to coat it, the steel strip has to have high strength, good weldability and should also exhibit a good surface quality. These requirements are especially important for industrially produced TRIP assisted dual phase steel types, which have to be formed into for instance automotive parts that will be spot welded into a body in white.

It is thus an object of the invention to find a composition of a high strength hot dip galvanised steel strip that strikes a balance between the formability and the processability of the strip.

It is a further object of the invention to provide a high strength hot dip galvanised steel strip that has a good coatability during the hot dip galvanising process.

It is a still further object of the invention to provide a high strength hot dip galvanised steel strip that has a good weldability.

It is another object of the invention to provide a high strength hot dip galvanised steel strip that has a good surface quality.

It is still another object of the invention to provide a high strength hot dip galvanised steel strip having a cost price that is as low as possible.

One or more of these objects are met according to the invention by providing a high strength hot dip galvanised steel strip consisting, in mass percent, of the following elements:
0.10-0.18% C
1.90-2.50 Mn
0.30-0.50% Si
0.50-0.70% Al
0.10-0.50% Cr
0.001-0.10% P
0.01-0.05 Nb
max 0.004% Ca
max 0.05% S
max 0.007% N
and optionally at least one of the following elements:
0.005-0.50% Ti
0.005-0.50% V
0.005-0.50% Mo
0.005-0.50 Ni
0.005-0.50% Cu
max 0.005% B
the balance being Fe and inevitable impurities,
wherein 0.80%<Al+Si<1.05% and Mn+Cr>2.10%.

The inventors have found that by a careful selection of the amounts of the main constituting elements of the steel, being carbon, manganese, silicon, aluminium and chromium, a high strength hot dip galvanised steel strip can be produced that has the required formability, processability, strength and elongation, while at the same time providing a sufficient weldability, coatability and surface quality. It has been found by the inventors that none of the examples given in the state of the art provide all these requirements at the same time.

The composition of the steel strip according to the invention is such that the formability of the steel is good and no necking occurs, and that the edge ductility of pressed parts is such that no cracking occurs.

The reason for the amounts of the main constituting elements is as follows.

C: 0.10-0.18 mass %. Carbon has to be present in an amount that is high enough to ensure hardenability and the formation of martensite at the cooling rates available in a conventional annealing/galvanising line. Martensite is required to deliver adequate strength. Free carbon also enables stabilisation of austenite which delivers improved work hardening potential and good formability for the resulting strength level. A lower limit of 0.10 mass % is needed for these reasons. A maximum level of 0.18 mass % has been found to be essential to ensure good weldability.

Mn: 1.90-2.50 mass %. Manganese is added to increase hardenability thus making the formation of martensite easier within the cooling rate capability of a conventional continuous annealing/galvanising line. Manganese also contributes to the solid solution strengthening which increases the tensile strength and strengthens the ferrite phase, thus helping to stabilise retained austenite. Manganese lowers the transformation temperature range of the dual phase steel, thus lowering the required annealing temperature to levels that can be readily attained in a conventional continuous annealing/galvanising line. A lower limit of 1.90 mass % is needed for the above reasons. A maximum level of 2.50 mass % is imposed to ensure acceptable rolling forces in the hot mill and to ensure acceptable rolling forces in the cold mill by ensuring sufficient transformation of the dual phase steel to soft transformation products (ferrite and pearlite). This maximum level is also given in view of the stronger segregation during casting and the forming of a band of martensite in the strip at higher values.

Si: 0.30-0.50 mass %. Silicon provides solid solution strengthening thus enabling the attainment of high strength, and the stabilisation of austenite via strengthening of the ferrite matrix. Silicon very effectively retards the formation of carbides during overaging, thus keeping carbon in solution for stabilisation of austenite. For these reasons a lower limit of 0.30 mass % is needed. A maximum level of 0.50 mass % is imposed in view of the coatability of the steel strip, since high levels of silicon lead to unacceptable coating quality due to reduced adherence.

Al: 0.50-0.70 mass %. Aluminium is added to liquid steel for the purpose of de-oxidation. In the right quantity it also provides an acceleration of the bainite transformation, thus enabling bainite formation within the time constraints imposed by the annealing section of a conventional continuous annealing/galvanising line. Aluminium also retards the formation of carbides thus keeping carbon in solution thus causing partitioning to austenite during overaging, and promoting the stabilisation of austenite. A lower level of 0.50 mass % is required for the above reasons. A maximum level of 0.70 mass % is imposed for castability, since high aluminium contents lead to poisoning of the casting mould slag and consequently an increase in mould slag viscosity, leading to incorrect heat transfer and lubrication during casting.

Cr: 0.10-0.50 mass %. Chrome is added to increase hardenability. Chrome forms ferrite and suppresses the formation of carbides, thus enhancing the forming of retained austenite. A lower level of 0.10 mass % is required for the above reasons. A maximum level of 0.5 mass % is imposed to ensure satisfactory pickling of the steel strip, and to keep the cost of the strip sufficiently low.

Ca: max 0.004 mass %. The addition of calcium modifies the morphology of manganese sulphide inclusions. When calcium is added the inclusions get a globular rather than an elongated shape. Elongated inclusions, also called stringers, may act as planes of weakness along which lamellar tearing and delamination fracture can occur. The avoidance of stringers is beneficial for forming processes of steel sheets which entail the expansion of holes or the stretching of flanges and promotes isotropic forming behaviour. Calcium treatment also prevents the formation of hard, angular, abrasive alumina inclusions in aluminium deoxidised steel types, forming instead calcium aluminate inclusions which are softer and globular at rolling temperatures, thereby improving the material's processing characteristics. In continuous casting machines, some inclusions occurring in molten steel have a tendency to block the nozzle, resulting in lost output and increased costs. Calcium treatment reduces the propensity for blockage by promoting the formation of low melting point species which will not clog the caster nozzles.

P: 0.001-0.10 mass %. Phosphorus interferes with the formation of carbides, and therefore some phosphorus in the steel is advantageous. However, phosphorus can make steel brittle upon welding, so the amount of phosphorus should be carefully controlled, especially in combination with other embrittling elements such as sulphur and nitrogen.

Sulphur and nitrogen are present in low amounts because these elements are detrimental for weldability.

Niobium is added in an amount between 0.01 and 0.05 mass % for grain refinement and formability. Niobium promotes transformation on the runout table and thus provides a softer and more homogeneous intermediate product. Niobium further suppresses formation of martensite at isothermal overaging temperatures, thereby promoting stabilisation of retained austenite.

The optional elements are mainly added to strengthen the steel.

In addition the reasons given above, the ranges for aluminium, chromium and manganese are chosen such that a correct balance is found to deliver complete transformation on the runout table to ensure a steel strip that can be cold rolled, and to provide a starting structure enabling rapid dissolution of carbon in the annealing line to promote hardenability and correct ferritic/bainitic transformation behaviour. Moreover, because aluminium accelerates and chromium decelerates the bainitic transformation, the right balance between aluminium and chromium has to be present to produce the right quantity of bainite within the timescales permitted by a conventional hot dip galvanising line with a restricted overage section.

Apart from the absolute contents of the elements as given above, also the relative amounts of certain elements are of importance.

Aluminium and silicon together should be maintained between 0.8 and 1.05 mass % to ensure suppression of carbides in the end product and stabilisation of a sufficient amount of austenite, with the correct composition, to provide a desirable extension of formability.

Manganese and chromium together should be above 2.10 mass % to ensure sufficient hardenability for formation of martensite and thus achievement of strength in a conventional continuous annealing line and hot dip galvanising line.

Preferably element C is present in an amount of 0.13-0.16%. In this range the hardenability of the steel is optimal while the weldability of the steel is enhanced.

According to a preferred embodiment element Mn is present in an amount of 1.95-2.40%, preferably in an amount of 1.95-2.30%, more preferably in an amount of 2.00-2.20%. A higher amount of manganese provides steel with a higher strength, so it is advantageous to raise the lower limit to 1.95 or even 2.00 mass % manganese. On the other hand, hot rolling and cold rolling of the steel is more difficult for higher amounts of manganese, so it is advantageous to lower the upper limit to 2.40, 2.30 or even 2.20 mass % manganese.

Preferably element Si is present in an amount of 0.35-0.45%. A higher amount of silicon instead of 0.30% ensures a better retardation of carbides during overaging, which is advantageous for the formability of the steel. A lower amount of silicon then 0.50% improves the coatability of the steel strip.

According to a preferred embodiment element Al is present in an amount of 0.55-0.65%. A raised lower level of aluminium has the same effect as a higher amount of silicon, but also improves the bainite formation. A lower upper limit of aluminium improves the castability of the steel.

Preferably element Cr is present in an amount of 0.20-0.50%, more preferably in an amount of 0.30-0.50%. A raised lower level increases the hardenability of the steel.

According to a preferred embodiment element Nb is present in an amount of 0.01-0.04%. As elucidated above, niobium improves the homogeneity of the intermediate product. The upper limit is mainly in consideration of the cost of niobium.

Preferably the steel has an ultimate tensile strength of 780 MPa. This strength can, due to the careful selection of the amounts of the elements present in the steel, be reached while the formability of a conventional 600 MPa dual phase steel is maintained.

According to a preferred embodiment the steel has a microstructure consisting of 55-75 volume % ferrite, 20-10 volume % bainite, 20-10 volume % martensite and 10-5 volume % metastable retained austenite.

According to a second aspect of the invention there is provided a method for producing a high strength hot dip galvanised steel strip as defined above, wherein the cast steel is hot rolled and cold rolled to a strip having a desired thickness, after which the strip is reheated in an annealing line to a temperature between the Ac1 and the Ac3 temperature of the steel type and fast cooled at a cooling rate such as to avoid retransformation to ferrite, after which isothermal overaging is applied to form bainite, and the strip is hot dip galvanised.

In this method, the deformation schedule during hot rolling, the finish rolling temperature and the subsequent cooling pattern on a run-out table can be selected to achieve a microstructure in the hot rolled product which is conducive to further reduction of thickness in the cold mill. In particular attention can be paid to limiting the strength of the hot rolled strip so as to minimise the required cold rolling loads. The temperature in the annealing line can be chosen such that the steel strip comprises both ferrite and austenite. The cooling rate should be such that in principle no ferrite is formed, and the isothermal overaging is applied to promote the formation of bainite. Hot dip galvanising can be performed in the usual manner. During this method the temperature and duration of most steps is critical for the realisation of the desired balance between strength and ductility in the final product.

As known to the skilled person, the iron-carbon eutectoid system has a number of critical transformation temperatures as defined below. These temperatures are dependent on chemistry and processing conditions:
A1—temperature below which the microstructure is composed of a mixture of ferrite (alpha-Fe) and Fe3C/pearlite;
A2—Curie temperature: temperature above which the material ceases to be magnetic;
A3—temperature above which the microstructure is entirely composed of austenite.
The suffixes c and r denote transformations in the heating and cooling cycle respectively.

The invention will be elucidated hereinafter; a number of compositions will be evaluated with regard to some well-known formability parameters that are elucidated first.

n-value: The work hardening coefficient or n-value is closely related to uniform elongation. In most sheet forming processes the limit of formability is determined by the resistance to local thinning or "necking". In uniaxial tensile testing necking commences at the extent of uniform elongation. n-value and uniform elongation derived from the tensile test can be taken as a measure of the formability of sheet steels. When aiming to improve formability of strip steels n-value and uniform elongation represent the most suitable optimisation parameters.

Hole expansion coefficient (HEC): To be successfully applied in industrial stamping operations, sheet metals must have a certain ability to withstand stretching of their sheared edges. This is tested in accordance with the international technical specification ISO/TS16630. A hole having a diameter of 10 mm is made in the centre of a test piece having the dimensions 90×90 mm. A cone punch of 40 mm diameter with a 60° apex is forced into the hole while the piece is fixed with a die having an inner diameter of 55 mm. The diameter of the hole is measured when a crack had extended through the thickness of the test piece. The maximum HEC was determined by: Max HEC %=((Dh−Do)/Do)×100, wherein Do is the original hole diameter and Dh is the diameter of the hole after cracking. Stretch flangeability is evaluated on the basis of the maximum HEC and is deemed satisfactory when HEC>25%

Erichsen Index (EI): The Erichsen test describes the ability of metals to undergo plastic deformation in stretch forming and is tested in accordance with the international standard test ISO 20482:2003. A hemispherical punch is driven into a fully clamped sheet. As lubrication graphite grease is used on top of the punch. The punch travel is stopped when a through thickness crack is detected. Due to friction the fracture is not on top of the punch but to the side, so not in equi bi-axial strain but more towards plane strain. The depth of the punch penetration is measured. The value of the Erichsen cupping index (IE) is the average of a minimum of three individual measurements, expressed in millimeters and for the present invention is deemed satisfactory when EI>10 mm.

Weldability: Resistance spot welding is the major joining technique used in the automotive industry, with an average car containing around 2000-3000 spot welds. Traditionally spot welds have always been a very cheap and reliable joint type, however since the introduction of AHSS, this reliability has been compromised. The weldability is measured by the ability of the material to be spot-welded. Welding conditions were taken from BS1140:1993 which are standard for industry, although not necessarily optimised for AHSS. Spot-welability is measured by the failure mode of the resultant spot-weld (plug). When a material cannot be welded then the plug will split along the interface between the two joining surfaces. In a fully welded material the failure will be in the parent metal, outside of the plug and preferably also outside the heat-affected zone. This is known as full-plug failure, that is the full plug is pulled out of the parent metal. Spot-weldability can be expressed on the scale between full-interface failure and full-plug failure with the former being deemed un-weldable.

One of the aims of the present invention is to provide a high strength hot dip galvanised steel strip that has a formability in the range of a 600 MPa AHSS hot dip galvanised steel strip, but having a strength level of an 800 MPa AHSS steel strip, that is a strength level of 780 MPa or higher. This is achieved by realising a suitable increase in the uniform elongation and n-value.

During the development of the high strength hot dip galvanised steel strip according to the invention a number of coils of strip have been produced as indicated in Table 1 with the alloys with letters A to S.

TABLE 1

| | chemical composition (wt. %) | | | | | | | | |
|---|---|---|---|---|---|---|---|---|---|
| Alloy | C | Mn | Cr | Si | Al | Nb | P | S | Ca | |
| A | 0.150 | 1.72 | 0.61 | 0.30 | 0.99 | 0.021 | 0.012 | 0.002 | — | Comparative |
| B | 0.154 | 1.74 | 0.58 | 0.41 | 0.62 | 0.023 | 0.009 | 0.002 | — | Comparative |
| C | 0.142 | 1.82 | 0.54 | 0.38 | 0.51 | 0.020 | 0.010 | 0.002 | 0.002 | Comparative |
| D | 0.147 | 1.90 | 0.49 | 0.42 | 0.61 | 0.025 | 0.012 | 0.002 | 0.002 | Inventive |
| E | 0.157 | 1.91 | 0.58 | 0.48 | 0.97 | 0.023 | 0.017 | 0.001 | 0.002 | Comparative |
| F | 0.181 | 1.93 | 0.60 | 0.43 | 0.55 | 0.023 | 0.014 | 0.003 | 0.002 | Comparative |
| G | 0.155 | 1.94 | 0.58 | 0.42 | 1.00 | 0.023 | 0.016 | 0.002 | 0.003 | Comparative |
| H | 0.148 | 1.96 | 0.57 | 0.42 | 0.61 | 0.021 | 0.016 | 0.002 | 0.002 | Comparative |
| J | 0.151 | 1.96 | 0.40 | 0.42 | 0.61 | 0.023 | 0.010 | 0.002 | 0.002 | Inventive |
| K | 0.149 | 2.06 | 0.50 | 0.39 | 0.62 | 0.022 | 0.011 | 0.002 | 0.003 | Inventive |
| L | 0.153 | 2.08 | 0.39 | 0.40 | 0.63 | 0.022 | 0.010 | 0.001 | 0.002 | Inventive |

TABLE 1-continued chemical composition (wt. %)

| Alloy | C | Mn | Cr | Si | Al | Nb | P | S | Ca | |
|---|---|---|---|---|---|---|---|---|---|---|
| M | 0.123 | 2.26 | 0.55 | 0.24 | — | — | — | — | — | Comparative |
| N | 0.216 | 1.64 | — | 0.46 | 0.32 | 0.001 | 0.032 | 0.005 | — | Comparative |
| P | 0.209 | 1.55 | — | 0.46 | 0.34 | 0.001 | 0.028 | 0.005 | — | Comparative |
| R | 0.230 | 1.65 | — | 0.46 | 0.44 | 0.001 | 0.092 | 0.004 | — | Comparative |
| S | 0.148 | 2.70 | 0.40 | 0.40 | 0.60 | 0.025 | 0.014 | 0.006 | — | Comparative |

In Table 1 the chemical composition or alloy is given for the steel strips produced in accordance with the method of the invention. In the last column of Table 1 is indicated whether the steel strip has a chemical composition according to the invention or not. The alloys D, J, K and L have an inventive composition. In the instances where no value has been given for an element, no value could be measured.

In Table 2 for a number of the steel strips of which the composition has been given in Table 1 above, relevant information on the respective mechanical properties are given.

TABLE 2 typical annealing cycles and mechanical properties

| Alloy | UTS [MPa] | $Rp_{0.2}$ [MPa] | U. El [%] | T. El [%] | n-value |
|---|---|---|---|---|---|
| A | 745 | 480 | 14.4 | 20.2 | 0.16 |
| B | 730 | 474 | 13.8 | 20.0 | 0.15 |
| C | 721 | 464 | 13.8 | 18.5 | 0.16 |
| D | 802 | | 15.0 | 19.2 | 0.17 |
| E | 885 | 512 | 12.5 | 17.0 | 0.13 |
| F | 792 | 451 | 13.7 | 17.9 | 0.16 |
| G | 845 | 473 | 12.3 | 16.0 | 0.14 |
| H | 780 | 435 | 14.1 | 19.6 | 0.16 |
| J | 783 | 487 | 16.4 | 21.9 | 0.18 |
| K | 789 | 457 | 15.2 | 20.2 | 0.17 |
| L | 822 | 486 | 14.9 | 19.7 | 0.17 |
| M | 915 | 450 | 9.0 | 11.1 | — |
| N | 712 | 438 | 18.4 | 24.2 | 0.18 |
| P | 772 | 471 | 16.9 | 21.6 | 0.19 |
| R | 784 | 470 | 16.9 | 21.2 | 0.21 |

UTS = ultimate tensile strength
$Rp_{0.2}$ = 0.2% proof stress
U. El = uniform elongation
T. El = total elongation From Table 2 follows that for the strip compositions or alloys D, J, K and L the annealing temperature and the overage temperature and time can be chosen such in a conventional annealing line that a high strength is reached (UTS at or above 780 MPa). Also the 0.2% proof stress is above 450 MPa for these alloys (not measured for alloy D), the uniform elongation is above 14% and the total elongation is above 19% The n-value is at least 0.17. Other alloys can reach the required UTS, but do not have the required 0.2% proof stress, uniform elongation and/or total elongation. Only alloy R fulfils these criteria, but Table 3 shows that this alloy is not weldable.

Table 3 shows that results of hole expansion coefficient tests, Erichsen tests and welding tests on a number of samples from the coils as indicated in Table 1 and 2. The higher the hole expansion coefficient and Erichsen value, the better the formability of the strip is.

TABLE 3 formability and weldability

| Alloy | Hole Expansion Coëfficiënt | Erichsen Index [mm] | Weldability |
|---|---|---|---|
| A | 18 | 10.4 | + |
| B | 16 | 10.1 | + |
| C | 29 | 9.7 | ++ |
| D | 29 | 10.0 | + |
| E | 22 | 9.4 | + |
| F | 20 | 9.4 | − |
| G | 20 | 8.7 | + |
| H | 20 | 9.3 | + |
| J | 30 | 10.5 | + |
| K | 25 | 10.0 | + |
| L | 25 | 10.1 | + |
| M | 13 | | ++ |
| N | 19 | 10.3 | −− |
| P | 18 | 9.7 | −− |
| R | 16 | 8.8 | −−− |
| S | | | −− |

Weldability key:
−−− not possible to obtain spot-weld joint
−− spot-weldable with mostly interface failure
− spot-weldable with mostly partial plug failure
+ spot-weldable with incidental partial plug failure
++ spot-weldable with full plug failure From Table 3 follows that the formability of steel strip D, J, K and L is reasonably good in view of the hole expansion coefficient and the Erichsen Index value, and that the weldability is also reasonably good.

The tables show that manganese is instrumental in achieving the desired combination of high strength and formability. Where the manganese content is lower than 1.9%, the desired tensile strength of 780 MPa is not achieved as can be seen from examples A, B, C, N and P. The only example where the strength is achieved with a manganese content below 1.9% is example R. In order to compensate for the low manganese, the alloy has very high additions of carbon and phosphor, such that the alloy is no longer spot-weldable. The formability of this alloy is also far below that deemed satisfactory in view of the Hole Expansion Coefficient and the Erichsen Index.

In examples E, F, G and H, the manganese content is within the specification leading to high strength, but the combination of secondary elements carbon (alloy F), chromium (alloys E, F, G and H) and aluminium (alloys E and G) lead respectively to poor spot-weldability, low ductility (as expressed by uniform elongation) and low formability (as expressed by HEC and EI).

In the example with high chromium, low silicon and no aluminium (alloy M), it can be seen that the tensile strength becomes the dominant mechanical property with the ductility (uniform and total elongation) and formability (HEC) is considerably reduced in comparison to the invention.

Finally, the spot-weldability of steels with a carbon content of more than 0.18 (alloys F, N, P and R) is considerably reduced in proportion to the carbon content. Example F has a carbon content just above the desired composition and, in combination with the high chromium content, leads to poor spot-weldability. This would appear to be a critical value for carbon content and it is not envisaged that an alloy containing considerably more carbon than 0.18% would be spot-weldable under normal circumstances.

It follows that a careful selection of the alloying elements is necessary in accordance with the invention, and that suitable processing steps during the annealing and overaging steps is required to achieve the desired properties of the TRIP assisted dual phase steel.

The high strength hot dip galvanised steel strip according to the invention has been used in a bumper beam for a vehicle. The steel strip to produce a bumper has to have sufficient ductility during the roll forming and stretch bending process, and enough residual ductility after forming should remain to prevent fracture upon crash of a vehicle using such a bumper, thereby maintaining the integrity of the crash structure of the front end of the vehicle. If the bumper beam would break, the integrity of the crash structure would be lost, which would result in a poor crash energy absorption.

The steel strip with the composition of alloy K was used to form the bumper. The forming of the bumper was successful, and the bumper has been welded on a backing plate without problem. A trial assembly of the beam thus formed of the bumper made of the TRIP assisted dual phase steel according to the invention and the backing plate of steel has been tested in a drop-weight test simulating a full frontal crash at 45 km/h with a pole in the centre of the bumper. No fracture of the bumper was seen. This is due to the superior ductility and formability of the TRIP assisted dual phase steel according to the invention, allowing for stretch forming of the component with sufficient post-forming ductility to absorb the crash impact.

The invention claimed is:

1. High strength hot dip galvanised steel strip consisting, in mass percent, of the following elements:
   0.149-0.16% C
   1.95-2.2% Mn
   0.35-0.45% Si
   0.55-0.65% Al
   0.30-0.50% Cr
   0.001-0.10% P
   0.01-0.04% Nb
   max 0.004% Ca
   max 0.05% S
   max 0.007% N;
and optionally at least one of the following elements:
   0.005-0.50% Ti
   0.005-0.50% V
   0.005-0.50% Mo
   0.005-0.50% Ni
   0.005-0.50% Cu
   max 0.005% B;
the balance being Fe and inevitable impurities,
wherein 0.80%<Al+Si<1.05% and Mn+Cr>2.10%;
   wherein the hot dip galvanised steel strip has
   an ultimate tensile strength of 780 MPa or higher;
   a uniform elongation above 14%;
   a total elongation of at least 19.7%; and
   a BS1140:1993 weldability of being spot-weldable.

2. Steel strip according to claim 1, wherein element C is present in an amount of 0.149-0.155%.

3. Steel strip according to claim 2, wherein element Mn is present in an amount of 1.95-2.08%.

4. Steel strip according to claim 3, wherein element Si is present in an amount of 0.40-0.45%.

5. Steel strip according to claim 4, wherein element Al is present in an amount of 0.6-0.65%.

6. Steel strip according to claim 5, wherein element Cr is present in an amount of 0.39-0.50%.

7. Steel strip according to claim 1, wherein the element Nb is present in an amount of 0.02-0.04%.

8. Steel strip according to claim 1, wherein the hot dip galvanised steel strip has an ultimate tensile strength of 780 MPa to 822 MPa.

9. Steel strip according to any claim 1, wherein the hot dip galvanised steel strip has a microstructure consisting of 55-75 volume % ferrite, 20-10 volume % bainite, 20-10 volume % martensite and 10-5 volume % metastable retained austenite.

10. Method for producing a high strength hot dip galvanised steel strip according to claim 1, wherein the cast steel is hot rolled and cold rolled to a strip having a desired thickness, after which the strip is reheated in an annealing line to a temperature between the Ac1 and the Ac3 temperature of the steel and fast cooled at a cooling rate to avoid retransformation to ferrite, after which isothermal overaging is applied to form bainite, and the strip is hot dip galvanised.

11. Steel strip according to claim 1, wherein element Mn is present in an amount of 2.00-2.20%.

12. Steel strip according to claim 7, wherein the element Ca is present in an amount of 0.002-0.004%.

13. Steel strip according to claim 1, wherein the hot dip galvanised steel strip has a 0.2% proof stress above 450 MPa and an n-value of at least 0.17.

14. Steel strip according to claim 1, wherein the hot dip galvanised steel strip has a hole expansion coefficient of 25-30 and an Erichsen Index of 10-10.5.

15. Steel strip according to claim 4, wherein element Al is present in an amount of 0.61-0.65%.

16. Steel strip according to claim 1, wherein the element Nb is present in an amount of 0.022-0.04%.

17. Steel strip according to claim 1, wherein the hot dip galvanised steel strip has a 0.2% proof stress above 450 MPa and an n-value of at least 0.17; a hole expansion coefficient of 25-30 and an Erichsen Index of 10-10.5.

* * * * *